United States Patent Office 3,049,330
Patented Aug. 14, 1962

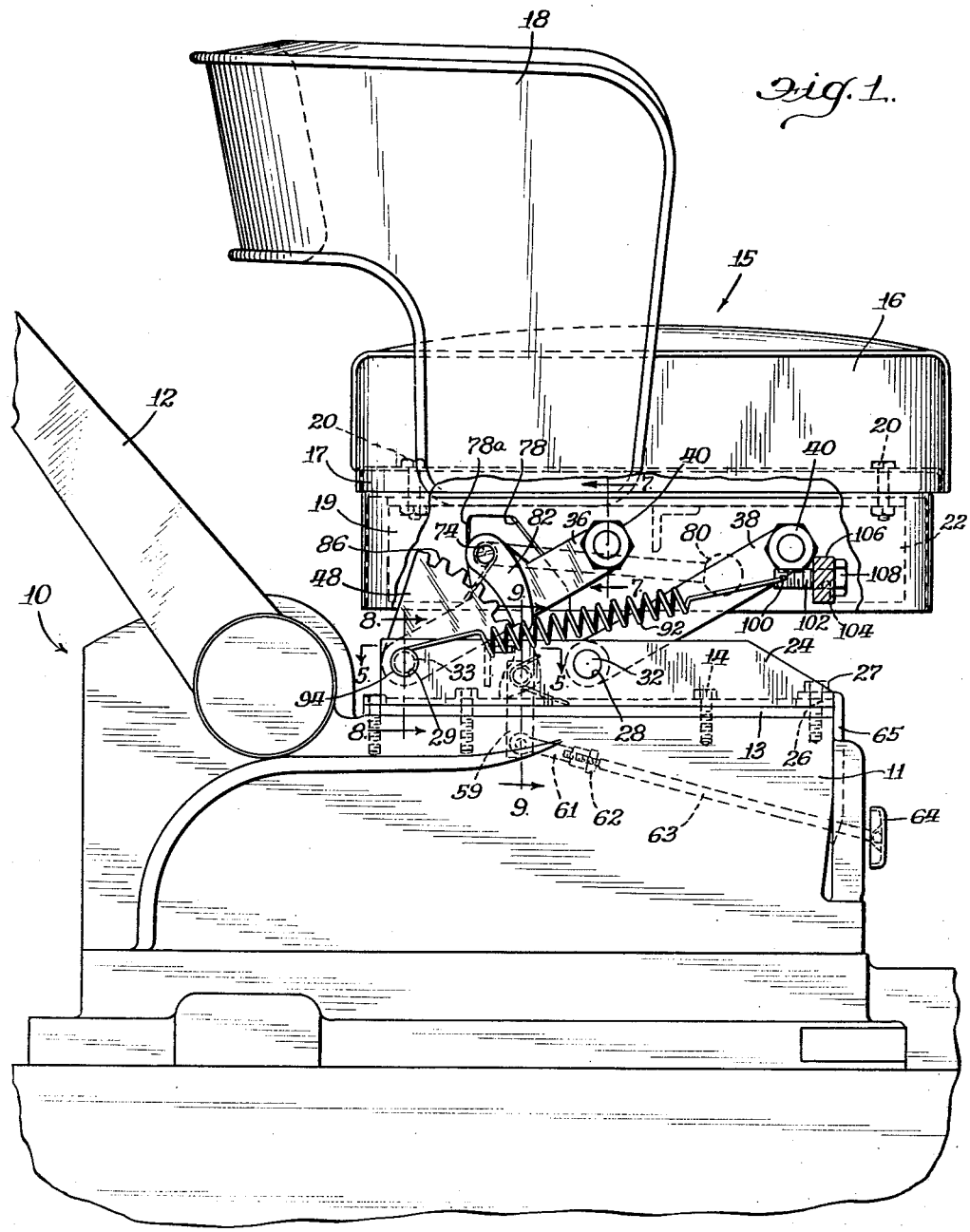

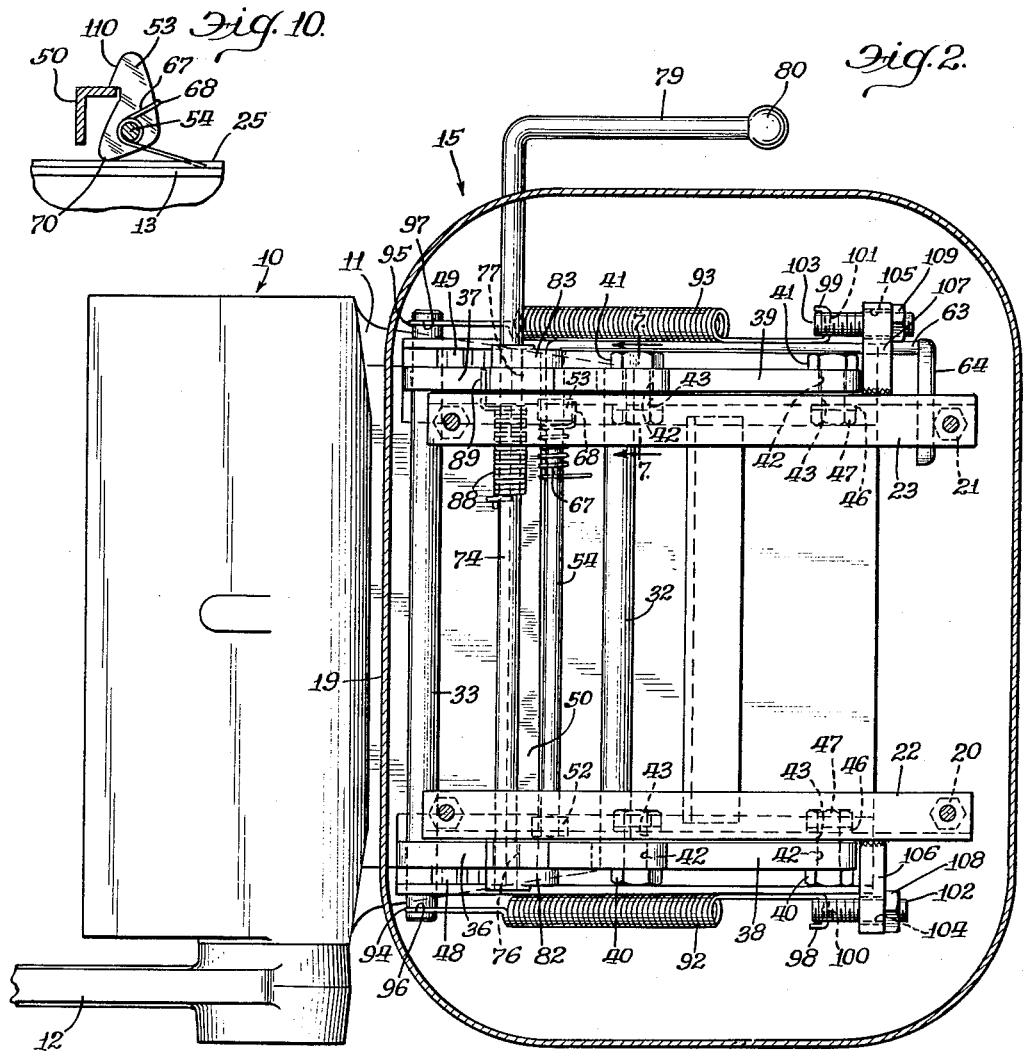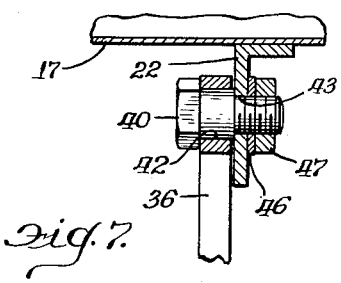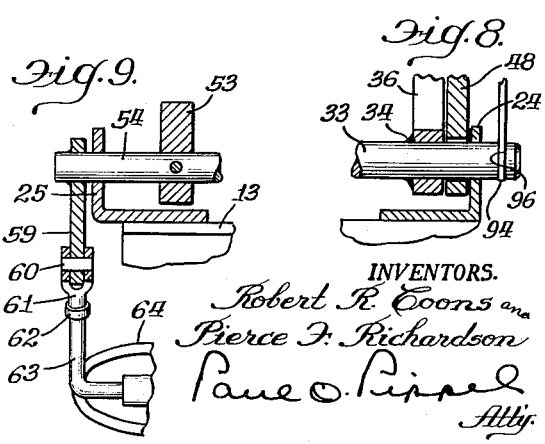

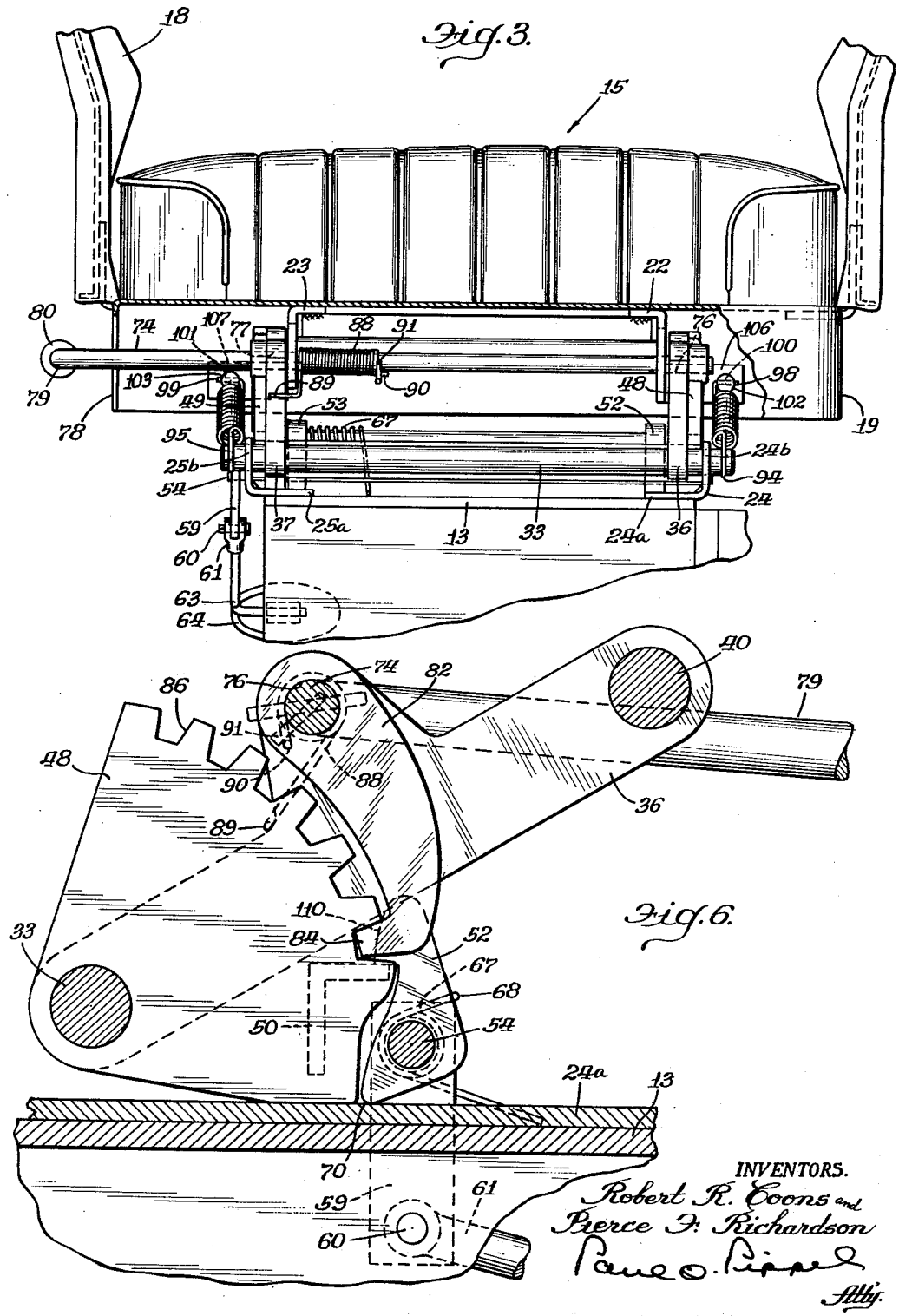

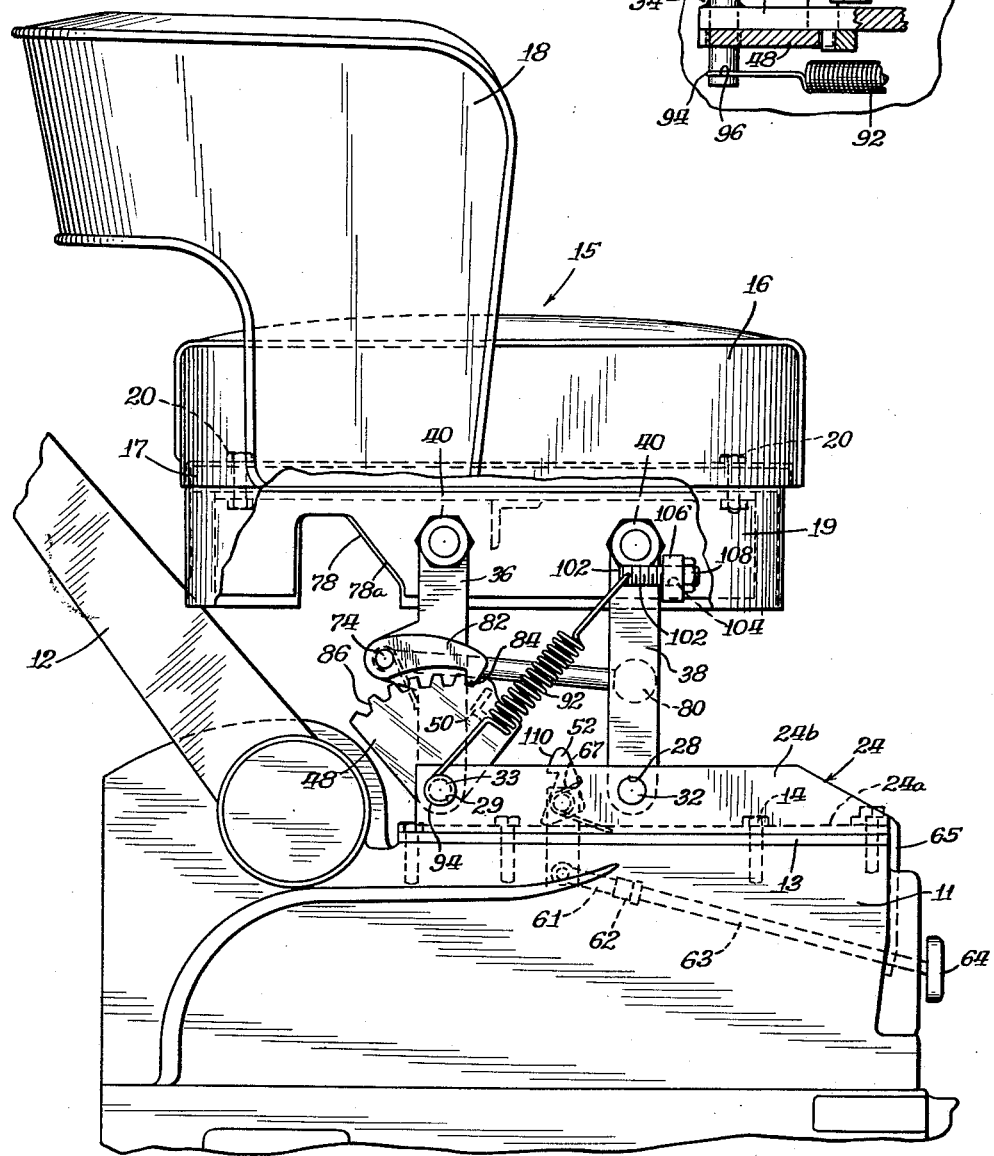

3,049,330
ADJUSTABLE SEAT SUSPENSION
Robert R. Coons, Chicago, and Pierce F. Richardson, Hinsdale, Ill., assignors to International Harvester Company, Chicago, Ill., a corporation of New Jersey
Filed June 23, 1961, Ser. No. 119,156
10 Claims. (Cl. 248—419)

This invention relates to seat assemblies for vehicles designed for use over extremely rough terrain such as may be encountered by farm tractors or military vehicles during their ordinary usage. More particularly, however, it is directed to a resilient, yieldable seat assembly that may be readily adjusted to provide a seat usable at a plurality of fore-and-aft displaced positions and vertical elevations thereof relative to a supporting vehicle.

One of the principal objects of the invention is to provide a seat suspension mechanism wherein a seat assembly may be adjusted to any one of a plurality of fore-and-aft displaced positions relative to a fixed support while simultaneously being moved through a plurality of different vertical elevations.

Another object is to provide a seat suspension mechanism wherein a seat assembly may be adjusted to any one of a number of predetermined fore-and-aft and vertically displaced positions relative to a support therefor and thereafter locked or fixedly secured in any selected one of such positions by manually actuable latching means.

A further object is to provide a seat suspension mechanism wherein the seat assembly after being pre-set to a selected fore-and-aft and vertically displaced position relative to a supporting vehicle may be raised and moved rearwardly out of the way of the driver of the vehicle and thereafter returned by applying a slight downwardly exerted force to its original pre-selected position without having to reset the mechanism for the previously selected position.

A still further object is to provide a seat suspension mechanism utilizing parallel link members rotating a resilient, yieldable seat assembly upwardly and rearwardly about fixed supports mounted on a vehicle and wherein during such rotative movement the seat component of the assembly is maintained in a horizontal position relative to the vehicle while additionally being securely fixable in any one of a plurality of such rotatively displaced positions.

A yet still further object is to provide in a seat suspension mechanism for a resilient, yieldable seat assembly, position setting means for fixing the seat in any one of a plurality of selected fore-and-aft and vertically displaced positions, and having releasable latching means for fixing the position of said seat assembly and its position setting means relative to a vehicle mounted support, and wherein spring biasing means are reactively operative upon release of said releasable means for raising the seat to an elevated rearwardly displaced position where it will not interfere with the vehicle operator when said operator assumes a standing position.

Other objects and advantages will be understood and will become more apparent from the following description when read in conjunction with the accompanying drawings in which:

FIG. 1 is a side elevational and partially cut-away view of the proposed seat unit shown as mounted on a tractor vehicle and wherein the vehicle is only fragmentarily illustrated;

FIG. 2 is a top plan view of the seat unit shown in the preceding drawing with certain non-essential portions thereof either being omitted or shown in section;

FIG. 3 is a rear end elevational view of the seat unit shown in the preceding views but with portions thereof cut-away or sectioned for clarity;

FIG. 4 is a side elevational view generally similar to FIG. 1 but shown with the seat in an elevated or raised position and out of the way of the operator of the vehicle;

FIG. 5 is a fragmentary horizontal sectional view taken generally along the line 5—5 of FIG. 1;

FIG. 6 is a fragmentary cut-away view in enlarged dimensions of certain portions of the latching components hereof;

FIG. 7 is a fragmentary vertical sectional view taken on line 7—7 of FIG. 1;

FIG. 8 is a fragmentary vertical sectional view taken on line 8—8 of FIG. 1;

FIG. 9 is a fragmentary vertical sectional view taken on line 9—9 of FIG. 1; and FIG. 10 is a fragmentary side elevational view, with portions thereof sectioned, of one of the latch arms and its biasing spring.

In the accompanying drawings wherein there is depicted one preferred form of the proposed invention it will be noted that the seat unit for illustrative purposes has been shown as mounted on a farm tractor type of vehicle with the vehicle indicated in its entirety by the reference character 10, and which vehicle includes as conventional components thereof a frame structure 11 and a power lift means 12 both of which are shown only fragmentarily. In the conventional farm tractor vehicle the rearward portion of the frame is usually fashioned with an opening in the top thereof to provide access to certain of the internal drive gear elements therein (not shown) and a plate such as 13 that covers said opening may be detachably fixed in place by suitable securing means such as the capscrews or bolts 14.

A seat assembly, indicated in its entirety by the reference numeral 15, as shown, generally includes a suitable resilient and yieldable cushion-like seat member such as 16 suitably affixed to and carried on a rigid base such as 17 with an arm rest and back support portion 18 also suitably affixed to the base. The particular cushioned-seat member, base and back portion components are generally conventional and well-known items or units of commerical manufacture that may take any one of a variety of forms without deviating from any of the teachings of this invention. It is also envisaged that the proposed invention would conceivably be used with seat assemblies of a more sophisticated type that incorporate therein additional shock-absorbing means, as well as adjustable means for compensating for the weight of the operator of the vehicle, such as is shown in the A. F. Hickman Patents 2,590,859, 2,691,406 and 2,783,822, but since it would serve no useful purpose to illustrate and describe such additional mechanisms herein the invention has been shown as utilized only with a simple well-known type of seat assembly. It will be understood, however, that it is not limited to such specific application but may be otherwise employed without deviating from any of the material inventive concepts thereof.

The seat base 17 has suitably secured thereto and depending therefrom a skirt-like member 19 that may extend around the perimeter of the seat unit. Attached to the bottom of the base, by suitable securing means such as the bolt and nut means indicated, respectively, at 20 and 21, are a pair of laterally spaced-apart and parallelly extending angle-like brackets 22 and 23 which are inwardly disposed relative to the side walls of the skirt 19. In FIGS. 1 and 4, a portion of the skirt 19 is shown as cut-away to better illustrate other more pertinent components of the invention. The seat unit, in turn, is affixed by rotatable parallel link means to mounting support brackets in a manner such as will permit relative movement between said seat unit and the vehicle upon which the support brackets are mounted.

The mounting support brackets 24, 25 which are laterally spaced-apart, parallelly extending and disposed one along either side of the vehicle frame 11, are each fashioned as L-shaped elongated angle members having a horizontal flange or base portion 24a, 25a and a vertically extending web or flange portion 24b, 25b. Apertures such as 26 are provided in the base flange portion thereof through which suitable bolts or capscrews 27 may be positioned to secure said brackets to the vehicle frame after being superimposed over the cover plate 13.

Apertures such as 28 and 29 in each of the brackets 24 and 25 are provided to rotatably receive a pair of parallel extending shafts 32, 33 which are spaced-apart along the fore-and-aft axis of the vehicle. The rearwardmost disposed shaft 33 thereof has mounted thereon and constrained for rotation therewith, by suitable affixing means such as the weld indicated by the reference character 34, a pair of link arms 36, 37 disposed one adjacent each end portion of the shaft. The forwardmost disposed shaft 32 of said parallel shafts, likewise, has mounted thereon and constrained for rotation therewith, by suitable affixing means such as welding (not shown), a pair of link arms 38, 39 disposed one adjacent each end portion of the associated shaft. The opposite or upper ends of said two pairs of link arms are pivotally fastened by suitable mounting means such as the bolts 40, 41, positionable through suitable apertures such as indicated by 42 in said arms and through aligned apertures such as 43 in the angle-like brackets 22, 23 affixed to the seat unit, and said bolts thereafter are fixed in place by suitable lock washers 46 and threaded nuts 47. As thus arranged the link arm members 36, 37 and 38, 39 will provide a parallel linkage type of mechanism for the seat assembly whereby when the seat assembly moves relative to the supports mounted on the vehicle the seat will move in a parallel displacing relationship.

The rearwardmost disposed shaft 33 of said parallel shafts has loosely mounted thereon, preferably, a pair of notched or toothed sector members 48, 49 with one being mounted proximate each end of the shaft and disposed outside the link arms and between said respective link arms and the mounting support brackets 24, 25. As thus mounted the sectors may rotate relative to the supporting shaft upon which they are pivoted and vice versa.

Extending laterally between the spaced-apart notched or toothed sectors 48, 49 is an elongated right angle-like member 50 which may be fixedly secured by suitable securing means, such as welding or the like (not shown), at opposite ends thereof to the respective sector members thus providing a rigid arrangement whereby both sectors will always be forced to move as a unit. The upwardly facing surface of said angle member is disposed to provide an abutment-like strike or hold-down stop means for engageable contact with latching means in the form of a pair of laterally spaced-apart latch arms 52, 53 disposed proximate opposite ends of a transversely extending shaft 54 upon which they are mounted and constrained to rotate therewith, and which shaft, in turn, is journaled at opposite ends thereof in apertures provided in the respective mounting support brackets 24, 25. Said latch arms are disposed, preferably, adjacent the inwardly facing surfaces of the respective link arms 36, 37 and on the opposite side thereof from said respective sector members. Securely affixed to an outwardly projecting end portion (left end as viewed in FIG. 3) of shaft 54 is a downwardly depending arm 59 the lower end of which may be pivotally attached by a pin 60 to a bifurcated or yoke end of an adjusting member 61. Said latter member, in turn, is connected through an adjusting nut 62 to a rigid thrust rod 63 whose opposite end may be fitted with a suitable physically engageable pad-like member such as the pedal shown at 64, and said rod may be supportably carried proximate the pedal end thereof by a bracket support such as 65 that is suitably affixed to the vehicle frame by bolt means 27.

A coil spring 67 wrapped around shaft 54 has one end thereof hooked or bent over as seen at 68 and engages a forward edge of the latch arm 53 (left arm as viewed in FIG. 3), while the opposite end of the said spring extends radially outwardly and abuttingly engages the top of the cover plate 13 so as to create a torsional pre-load stress therein that normally biases said latch arm rearwardly and attendant therewith constantly urges the interconnected latch arms 52, 53 into an interlocking or latching engagement or relationship with the strike or hold-down member 50. Now in order to release said latch arms from their locking engagement with the hold-down member it is only necessary to exert a suitable force against the pedal 64 whereupon the reactive force of the spring 67 is overcome and simultaneous therewith the latch arms 52, 53 are rotated away from their locking engagement with said hold-down member. Subsequent release of force against the pedal 64 permits the spring 67 to return both the latch arms 52, 53 to a position adaptable for the reengagement thereof with the hold-down member 50. The bottom or lower edge of each latch arm 52, 53, preferably, is fashioned to provide a stop such as 70 which is dimensioned to effect engagement thereof with the horizontal flange portions 24a, 25a of the proximate support brackets 24, 25 and thereby restrict or delimit the rearward rotative movement limit of each of said latch arms when the previously applied external force is removed from the pedal 64.

A transversely extending shaft 74 is journaled in aligned apertures 76, 77 in the respective link arms 36, 37 and the left end of the shaft (as viewed in FIG. 3) extends outwardly beyond and projects through a slot-like opening or recess 78 in the left side portion of the skirt 19 while a similarly conformed and aligned recess such as the one indicated at 78a is provided in each of the angle brackets 22, 23, and said shaft is fitted with an operating lever 79 having a ball-like handle member 80 on the forward end thereof adaptable for manual grasping or manipulation by the vehicle operator. A pair of transversely spaced-apart pawl arms 82, 83 are mounted upon and constrained for rotation with the shaft 74 and are disposed for interlockable engagement one each with a respective sector member by means of a hook-like projection or detent finger portion such as the one shown at 84 which are dimensioned for ready insertion into the notches or teeth, as indicated at 86, of each of said sectors. A coil spring 88 wrapped around the shaft 74 has an end bent over, as shown at 89, which is disposed for abutting engagement with an edge portion of the left rearmost link arm 37, and a loop 90 formed on the opposite end of said spring is looped over a radially disposed pin 91 fixed in the shaft to suitably anchor the spring to said shaft. By placing a slight pre-load on this spring a torsional stress is created therein which may be used to normally bias each of the pawls 82, 83 and thereby constantly urge them into engagement with a respective notched or toothed sector member. Now in order to effect the release from said engagement the handle 80 is simply raised by the operator a distance sufficient to overcome said bias and to permit the pawls to be rotated relative to the sectors and vice versa.

Although a pair of pawls 82, 83 and a pair of latch arms 52, 53 have been shown and described the present invention envisages being able to accomplish generally good results by using only one of each such members and still incorporate therein the inventive concepts hereof, and hence the invention should not be limited to the specific structural disclosure depicted in the accompanying drawings.

While it is readily feasible to raise and lower the seat unit 15 manually, it is preferred that the raising thereof be accomplished by suitable resilient means incorporated into the mechanism thereby reducing the effort and attention required of the operator. In the present invention this objective is attained by means of a pair of transversely spaced-apart coil springs 92, 93 which are connected in a pre-stressed condition between the lower rearmost rotatable axis of the link arms and a point proximate the upper forwardmost rotatable axis of the link arms so as to bias or constantly urge the seat unit upwardly and rearwardly. Each of the coil springs 92, 93 has one end thereof formed into a loop 94, 95 that is dimensioned to closely conform with the curvature of annular grooves 96, 97 in the rear shaft 33 into which the hooped end of each spring is hooked. The opposite ends of the said springs are also provided with a loop such as 98, 99 that is hooked through an opening such as 100, 101 transversely disposed in threaded rods or studs 102, 103. Said rods, in turn, are slidably supported in openings 104, 105 in stop brackets 106, 107 suitably affixed to and extending outwardly from the angle brackets 22, 23. Nuts 108, 109 threaded on the outer end of said respective studs abut the stop brackets 106, 107 and thus provides a means for adjustably stressing these springs.

Operation

Normally when the seat unit is in an operative position, i.e., when it is in position for the operator to sit upon it, the latch arms 52, 53, being biased rearwardly or into a counterclockwise rotation by the spring 67, will be urged into a locking or latching engagement with the strike or hold-down member 50 and, since the latter is fixedly secured to the notched or toothed sector members 48, 49, this will prevent any rotative movement of said sectors about the shaft 33 upon which the sectors are rotatably mounted. At the same time the pawl arms 82, 83, being clockwise biased by the spring 88, will be urging the detent finger portions 84, 84 thereof into the nearest available teeth or notches of the respective sector members 48, 49 and, since the pawls are mounted on shaft 74 which is journaled in the link arms 36, 37, there can be no movement of said link arms relative to said sectors or to the support brackets 24, 25 affixed to the vehicle.

Assume now that it becomes desirable to elevate or increase the vertical spacing of the seat unit (from the position shown in FIG. 1) relative to the vehicle, in which case the vehicle operator raises the handle 80 so as to disengage the pawl detents 82, 83 from the associated notched sectors thereby freeing the seat unit and permitting it to be rotated by the link arms 36, 37 and 38, 39 upwardly and rearwardly about the axes extending through the shafts 32, 33. This, of course, may be done manually by the operator when there is no elevating spring means provided or, as illustrated herein, it may be accomplished by the elevating springs 92, 93. Since the springs 92, 93 in their pre-stressed condition are disposed to urge the seat unit upwardly they will be free to do so as soon as the pawl detents are released from engagement with the notched sectors and the weight of the operator is substantially removed from the seat. Then, when the desired seat elevation has been attained the operating handle 80 is released and the pawl detents 82, 83 become free to seek reception into the nearest available notches 86, 86 in the respective sectors after which the seat unit becomes fixedly positioned at the newly selected elevation. To lower the seat unit the operating handle 80 is raised to release the pawl detents 82, 83 from the engaged notched sectors 48, 49 and thereafter sufficient force is applied to the seat by the operator to lower the seat against the reaction of springs 92, 93. When the seat has been lowered to the newly selected position the handle 80 is released and the pawls detent fingers 84, 84 then seek out reception into the nearest available teeth or notches 86, 86 in the respective sectors and upon completion of this action the seat thereupon is fixed in its newly selected position.

Occasionally it is desirable to move the seat out of the way of the operator so that the operator may operate the vehicle from a standing instead of a sitting position. To accomplish this objective sufficient force is exerted on the pedal 64 to effect the release of the latch arms 52, 53 from engagement with the strike or hold-down member 50 and thereafter the seat may be rotated upwardly and rearwardly about the axes of the shafts 32, 33. If the unit is not equipped with elevating springs such as 92, 93 the seat may be manually raised by the operator, but if there is an elevating spring means associated therewith when the operator removes his weight from the seat the springs 92, 93 will rotate the unit upwardly and rearwardly to the position shown in FIG. 4. During this movement, since there is no relative displacement between either of the pawl arms 82, 83 and the respective interlocking sectors 48, 49, it will be appreciated there will be no disturbance of the setting or pre-selected vertical spacing position of the mechanism. This being the case the seat may now be returned to its original or pre-selected position merely by placing sufficient weight thereupon to rotatively return the seat to a position such that the hold-down member 50 may be reengaged in a latching relation by the latch arms 52, 53. It will be understood, of course, that force on the pedal 64 may be removed as soon as the latch arms 52, 53 free themselves of the hold-down member 50 and thereafter the stops 70, 70 on said arms will prevent any excess rearward rotation thereof. Likewise, it will be seen that the tapered rearward edge, such as indicated at 110, on each of the respective latch arms are disposed so that upon contact with the hold-down member 50, said member will cause the rotation of said arms against the bias of spring 67 and thus effect the relatching or locking of the latch arms with the hold-down member 50.

While only one form of the invention has been shown, and that form described in detail, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a seat structure having a seat and a support therefor the improvement residing in suspension means for the seat, comprising: fore and aft suspension links mounting the seat on and for movement vertically relative to the support and having a transverse lower pivot to the support and a transverse upper pivot to the seat for each link; biasing means having one end thereof connected to the seat and the opposite end connected to the support and stressed for normally constantly urging the seat upwardly; latching means including a latch member having a lower transverse pivot to the support, and biasing means disposed for constantly urging said latch member rearwardly about said lower pivot thereof; a plural notched sector member pivotally mounted on the transverse lower pivot of the aft link; detent means including a pawl member having an upper transverse pivot to the aft link and including biasing means disposed for constantly urging the pawl normally into engagement with one of the notches of said sector; a manually operative lever connected to said pawl and operative for releasing said pawl from engagement with said notched sector; hold-down means including a member rigidly affixed to said sector member and disposed for locking engagement with said latch member whereby when said latch member and hold-down member are interlocked rotative movement of said notched sector relative to said support is restricted.

2. In a seat structure having a seat and a support therefor the improvement residing in suspension means for the seat, comprising: fore and aft suspension links mounting the seat on and for movement vertically relative to the support and having a transverse lower pivot to the support and a transverse upper pivot to the seat for each link; a plural notched sector member pivotally mounted on the transverse lower pivot of the aft link; detent means including a pawl member having a transverse pivot at the upper end thereof to the aft link and disposed for interlocking engagement selectively with the notches of the sector, and having biasing means disposed for constantly urging the pawl normally into engagement with a selected one of the notches of said sector; a manually actuable lever connected to said pawl and operative for releasing said pawl from engagement with said notched sector; said sector being normally disposed for abutting engagement with the support for restricting downward rotation thereof attendant a downward movement of the seat relative to the support; hold-down means for preventing upward movement of the seat relative to the support including a hold-down member rigidly affixed to said sector member, and a latch member having a transverse pivot at the lower end thereof to the support and being disposed for latching engagement with said hold-down member to prevent upward movement thereof, and biasing means disposed for constantly urging said latch member normally into latching engagement with said hold-down member; and manually actuable means connected to said latch member and operative for releasing said latch from engagement with said hold-down member.

3. In a seat structure having a seat and a support therefor the improvement residing in suspension means for the seat, comprising: fore and aft suspension links mounting the seat on and for movement vertically relative to the support and having a transverse lower pivot to the support and a transverse upper pivot to the seat for each link; biasing means having one end thereof connected to the seat and the opposite end connected to the support and disposed for constantly urging the seat upwardly relative to the support; a plural notched sector pivotally mounted on the transverse lower pivot of the aft link and normally disposed into abutting engagement with the support for restricting downward rotation thereof; detent means including a manually actuable pawl member pivotally mounted on the aft link and disposed for interlocking engagement one at a time with the notches of the sector, and having biasing means disposed for constantly urging the pawl normally into engagement with a selected one of the notches of said sector; hold-down means for preventing upward movement of the seat relative to the support including a member rigidly affixed to said sector and projecting therefrom, and a latch member having a transverse pivot at the lower end thereof to the support and being disposed for latching engagement with said hold-down member to restrict upward movement thereof, and biasing means disposed for constantly urging said latch member normally into latching engagement with said hold-down member; and actuable lever means connected to said latch member and operative for releasing said latch member from engagement with said hold-down member.

4. In a seat structure having a seat and a support therefor the improvement residing in suspension means for the seat, comprising: fore and aft suspension links mounting the seat on and for movement vertically relative to the support and having a transverse lower pivot to the support and a transverse upper pivot to the seat for each link; biasing means having one end thereof connected to the seat and the opposite end connected to the support and disposed for constantly urging the seat upwardly relative to the support; an arcuate edge sector member pivotally mounted on the transverse pivot of the aft link and having a plurality of radially extending notches disposed in spaced relation along the arcuate edge thereof centered on the axis of the transverse pivot about which the sector pivots, and having said sector normally disposed into abutting engagement with the support for restricting downward rotation thereof; detent means including a manually actuable pawl member pivotally mounted on the aft link and disposed for interlocking engagement one at a time with the notches of the sector, and including biasing means disposed for constantly urging the pawl normally into engagement with a selected one of the notches of said sector; said pawl member being engageable with any one of the notches of said sector for establishing the vertical spacing between the seat and the support according to the location of the particular notch selected for engagement; hold-down means for preventing upward movement of the seat relative to the support including a hold-down member rigidly affixed to and projecting axially outwardly from said sector member, and a latch member having a transverse pivot at the lower end thereof to the support and disposed for latching engagement with said hold-down member to prevent upward movement thereof, and including biasing means disposed for constantly urging said latch member normally into latching engagement with said hold-down member; and manually actuable means connected to said latch member and operative for releasing said latch from latching engagement with said hold-down member.

5. In a seat structure having a seat and a support therefor the improvement residing in suspension means for the seat, comprising: fore and aft suspension links mounting the seat on and for movement vertically relative to the support and having a transverse lower pivot to the support and a transverse upper pivot to the seat for each link; biasing means including a coil spring having one end thereof connected to the seat proximate to and below the upper transverse pivot of the fore link and having the opposite end connected to the lower pivot of the aft link and being stressed for normally urging the seat upwardly; a notched sector member pivotally mounted on the transverse lower pivot of the aft link and being disposed normally into abutting relation with the support for restricting downward rotation thereof; detent means including a manually actuable pawl member pivotally mounted on the aft link and disposed for interlocking engagement with a selected one of the notches of the sector, and including biasing means disposed for constantly urging the pawl normally into engagement with a selected one of the notches of said sector; hold-down means for preventing upward movement of the seat relative to the support when said pawl member is in interlocking engagement with said notched sector including a member rigidly affixed to said sector and projecting axially therefrom, and a latch member having a transverse pivot at the lower end thereof to the support and being disposed for latching engagement with said hold-down member to restrict upward movement thereof, and biasing means disposed for constantly urging said latch member normally into latching engagement with said hold-down member; and actuable lever means connected to said latch member and operative for releasing said latch member from engagement with said hold-down member.

6. In a seat structure having a seat and a support therefor the improvement residing in suspension means for the seat, comprising: fore and aft suspension links mounting the seat on and for movement vertically relative to the support and having a transverse lower pivot to the support and a transverse upper pivot to the seat for each link; biasing means including a coil spring having one end thereof connected to the seat proximate to and below the upper tranverse pivot of the fore link and having the opposite end connected to the lower pivot of the aft link and being stressed for normally urging the seat upwardly; interlocking means including a portion pivotally mounted on the aft link and a cooperating portion pivotally mounted on the lower pivot of the aft link and having said portions adjustably interlockable with one another for selectively fixing the vertical spacing between the seat and the support in any one of a plurality of selectable positions, and biasing means disposed for normally urging said portions into interlocking engagement with one another; hold-down means for preventing upward movement of the seat relative to the support including releasable latching means mounted in part on the support and in part on the portion of said interlocking means pivotally mounted on the lower pivot of the aft link, and biasing means constantly urging said latching means into latching engagement with the hold-down means part mounted on the portion of said interlocking means pivotally mounted on the lower pivot of the aft link; and actuable lever means connected to said latching means and operative for releasing said latching means from engagement with the hold-down means part mounted on the interlocking means.

7. A seat structure, comprising: support means including a pair of transversely spaced-apart fore and aft extending support members; a seat disposed above the support members; suspension linkage mounting the seat on and for movement vertically relative to the support members and including a pair of fore and a pair of aft disposed suspension links having transversely coaxial lower pivots to the support members and transversely coaxial upper pivots to the seat, one link of each pair of links being disposed proximate each support member; first biasing means including a pair of coil springs disposed one each proximate a support member and having one end of each spring connected to the seat proximate to and below the upper coaxial pivots of the fore links and having the opposite end of each spring connected to the lower coaxial pivots of the aft links and being stressed for normally urging the seat upwardly; interlocking means including first portions pivotally mounted one each on an aft link and cooperating second portions pivotally mounted one each on the transversely coaxial lower pivots and disposed one each proximate an aft link and having said first and second portions interlockable with one another at adjustably displaced positions relative to one another for selectively positioning the vertical spacing between the seat and the support members in any one of a plurality of selectable positions, and second biasing means disposed for normally urging said first portions into interlocking engagement with said respective second portions; hold-down means for preventing upward movement of the seat relative to the support members including releasable latching means mounted in part on the support means and in part on the said second portions of said interlocking means, and third biasing means constantly urging said latching means into latching engagement with the part of the hold-down means mounted on said second portions; and actuable lever means connected to said latching means and operative for releasing said latching means from engagement with the part of the hold-down means mounted on the interlocking means.

8. A seat structure, comprising: support means including a pair of transversely spaced-apart fore and aft extending support members; a seat disposed above the support members; suspension linkage mounting the seat on and for movement vertically relative to the support members and including a pair of forward and a pair of rearward disposed suspension links with the individual links of each pair rigidly interconnected at the lower ends thereof and pivotally mounted by said interconnection to said supports and with the individual links of each pair rigidly interconnected at the upper ends thereof and pivotally mounted by said latter interconnection to said seat, one link of each pair of links being disposed proximate each support member; first biasing means stressed for normally urging the seat upwardly including coil springs disposed one each proximate a support member and having the upper end of each spring connected to the seat proximate to and below the upper pivotal mountings of the forward links and having the opposite end of each spring connected to the lower rigid interconnection of the rear links; interlocking means cooperative between the suspension links and the supports for selectively determining the vertical spacing between the seat and the support members including a pair of arcuate edge sector members pivotally mounted one each proximate a rear link on the rigid interconnection between said rear links and having a plurality of radially extending notches disposed in spaced relation along an arcuate edge of the sector and centered on the axis of rotation of the rigid interconnection between said links, and having said sectors normally disposed into abutting engagement with the respective support members for restricting downward rotation thereof, and a pair of manually actuable pawl members rigidly interconnected and pivotally mounted one each on a rear link and disposed for interlocking engagement with the notches of the respective sector members, and second biasing means disposed for constantly urging the pawls normally into engagement with a selected one of the notches of each of said respective sector members; hold-down means for preventing upward movement of the seat relative to the support members including a hold-down member extending between and rigidly interconnecting said sector members together, and a pair of latch members rigidly interconnected and disposed one each proximate a support member and pivotally mounted by said latter rigid interconnection at the lower end of each latch to said respective support members and arranged for latching engagement with said hold-down member to prevent upward movement thereof, and including third biasing means disposed for constantly urging said latch members normally into latching engagement with said hold-down member; and means manually actuable connected to said latch members and operative for releasing said latch members from latching engagement with said hold-down member.

9. A seat structure, comprising: support means including a pair of transversely spaced-apart fore-and-aft extending support members; a seat disposed above the support members; suspension linkage mounting the seat on and for movement vertically relative to the support members and including a pair of forward and a pair of rearward disposed suspension links with the individual links of each pair rigidly interconnected at the lower ends thereof and pivotally mounted by said interconnection to said supports and with the individual links of each pair rigidly interconnected at the upper ends thereof and pivotally mounted by said latter interconnection to said seat, one link of each pair of links being disposed proximate each support member; notched sector members pivotally mounted on the rigid interconnection between the lower ends of the rear links and disposed one adjacent each rear link and having an end edge of each sector disposed normally into abutting relation with a respective support member for restricting downward rotation of the sector members; detent means disposed for interlocking engagement with said notched sectors including a pair of transversely spaced-apart pawl members rigidly interconnected together at one end thereof and pivotally mounted by said rigid interconnection one pawl each proximate a respective rear link and arranged for engagement with selected ones of the notches in the respective sector members, and including biasing means reactive between said latter rigid interconnection and one of said rear links normally urging said pawls into engagement with a selected one of the notches in a respective sector member; hold-down means for preventing upward movement of the seat relative to the support members including a rigid hold-down member extending between and fixedly interconnecting said sector members together, and a pair of rigidly interconnected latch members disposed one each proximate to and pivotally mounted on a support member by the rigid interconnection between said latch members and having said latch members arranged for latching engagement with said rigid hold-down member to prevent upward movement thereof, and including biasing means disposed for constantly urging said latch members normally into latching engagement with said hold-down member; and means manually actuable connected to said latch members and operative for releasing said latch members from latching engagement with said hold-down member.

10. In a seat structure having a seat and a support therefor, the improvement residing in suspension means for the seat, comprising: Fore and aft suspension links mounting the seat on and for movement vertically relative to the support and having a transverse lower pivot to the support and a transverse upper pivot to the seat for each link; biasing means having one end thereof connected to the seat and the opposite end connected to the support and stressed for normally constantly urging the seat upwardly; latching means including a latch member having a transverse pivot to the support, and biasing means disposed for constantly urging said latch member about said pivot thereof; a plural notched sector member pivotally mounted on one of said links; detent means including a pawl member having a transverse pivot to one of said links and including biasing means disposed for constantly urging the pawl normally into engagement with one of the notches of said sector; a manually operative lever connected to said pawl and operative for releasing said pawl from engagement with said notched sector; hold-down means including a member rigidly affixed to said sector member and disposed for locking engagement with said latch member whereby when said latch member and hold-down member are interlocked rotative movement of said notched sector relative to said support is restricted.

References Cited in the file of this patent

UNITED STATES PATENTS 2,527,905   Barecki _____ Oct. 31, 1950